United States Patent

Pong

[11] Patent Number: 6,075,469
[45] Date of Patent: Jun. 13, 2000

[54] THREE STROKE CHINESE CHARACTER WORD PROCESSING TECHNIQUES AND APPARATUS

[76] Inventor: Gim Yee Pong, 45-11 156th St., Flushing, N.Y. 11355

[21] Appl. No.: 09/132,453

[22] Filed: Aug. 11, 1998

[51] Int. Cl.7 .................................................. H03M 11/00
[52] U.S. Cl. ............................. 341/28; 345/171; 707/536
[58] Field of Search .................................. 341/28, 20, 22; 345/171; 707/536; 379/353, 354; 704/8; 400/110; 382/185

[56] References Cited

U.S. PATENT DOCUMENTS

| | | | |
|---|---|---|---|
| 4,284,975 | 8/1981 | Odaka | 382/185 |
| 4,379,288 | 4/1983 | Leung et al. | 341/28 |
| 4,511,267 | 4/1985 | Pokorny et al. | 400/110 |
| 4,559,615 | 12/1985 | Goo et al. | 707/535 |
| 4,565,459 | 1/1986 | DiLucia | 400/110 |
| 4,621,340 | 11/1986 | Pokorny et al. | 345/468 |
| 4,739,318 | 4/1988 | Cohen | 345/142 |
| 4,748,443 | 5/1988 | Uehara et al. | 345/142 |
| 4,758,979 | 7/1988 | Chiao-Yueh | 382/185 |
| 5,378,068 | 1/1995 | Hua | 400/110 |
| 5,420,306 | 5/1995 | Noyori et al. | 549/326 |
| 5,475,767 | 12/1995 | Du | 382/185 |
| 5,634,134 | 5/1997 | Kumai | 395/798 |
| 5,724,031 | 3/1998 | Huang | 341/28 |
| 5,952,942 | 9/1999 | Balakrishnan et al. | 341/22 |

*Primary Examiner*—Michael Horabik
*Assistant Examiner*—Albert K. Wong
*Attorney, Agent, or Firm*—Cobrin & Gittes

[57] ABSTRACT

An apparatus and a method of Chinese character word processing that includes interpreting key entries as signifying components of Chinese characters, the components being selected from a group consisting of roots and three types of strokes, namely horizontal strokes, vertical strokes, and slant strokes, the roots being a composite of the three types of strokes; counting the horizontal strokes found in the components corresponding to the key entries to obtain a total count of the horizontal strokes; counting the vertical strokes found in the components corresponding to the key entries to obtain a total count of the vertical strokes; counting the slant strokes found in the components corresponding to the key entries to obtain a total count of the slant strokes; and forming a desired Chinese character that contains a total number of horizontal strokes equal to the total count of the horizontal strokes, a total number of vertical strokes equal to the total count of the vertical strokes and a total number of slant strokes equal to the total count of the slant strokes.

10 Claims, 4 Drawing Sheets

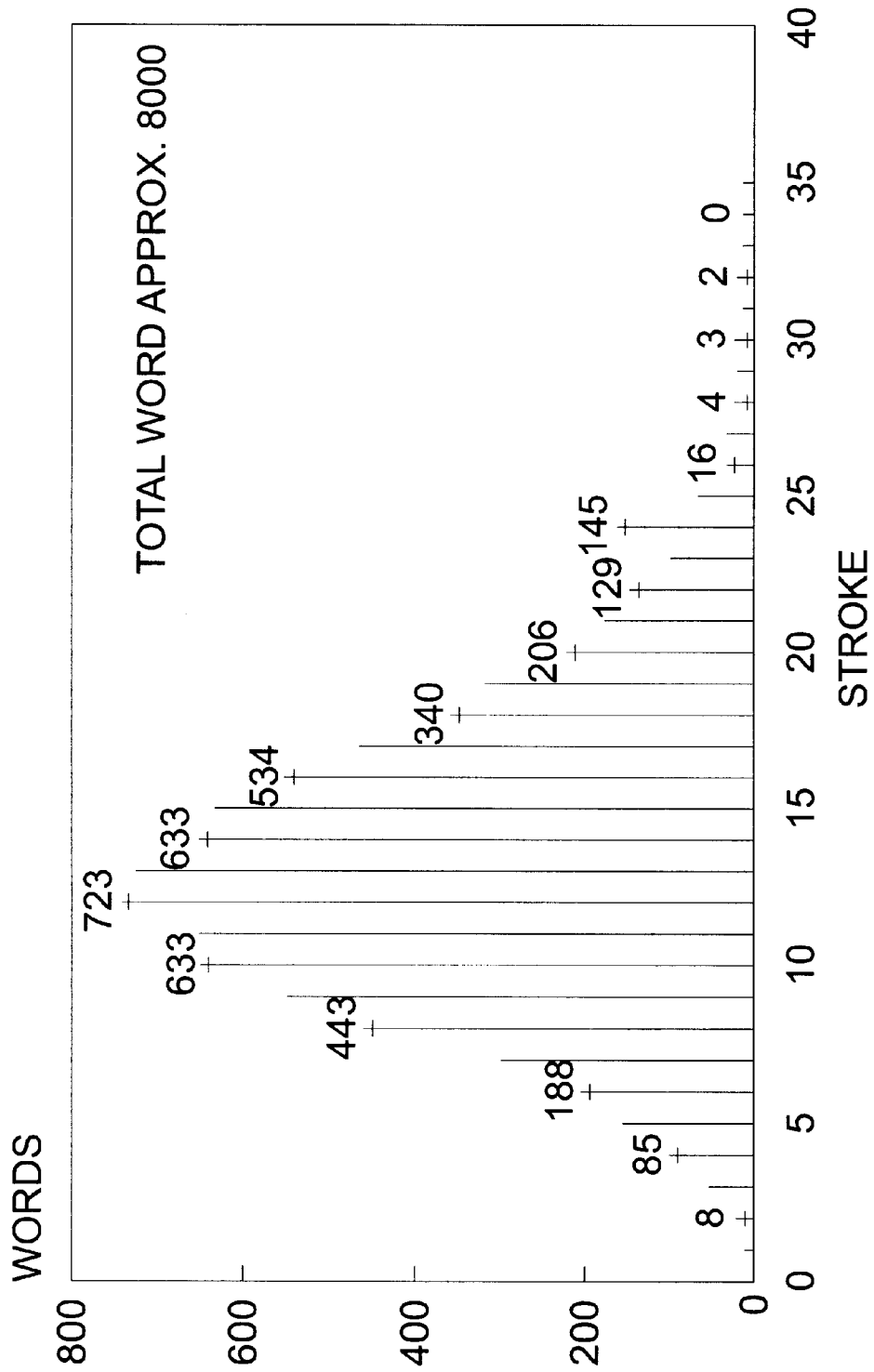

THREE STROKE CHINESE CHARACTER WORD PROCESSING TECHNIQUES AND APPARATUS

BACKGROUND OF THE INVENTION

1. Field of the Invention

This invention is related to encoding and decoding Chinese characters using a Chinese word processor program. The program is loaded into a computer that has a standard keyboard, but the letters on the keys are replaced with strokes and roots (simple characters). The computer processes each root key entry based upon three basic strokes: horizontal (-), vertical (|) and slant (/).

2. Description of Related Art

Both the English written language and the Chinese written language characters have an alphabet of 26 writing strokes (listed later on) that can be used to write any character. Unlike the English written language, the writing space allocated for each character of the Chinese written language is the same, regardless of the number of strokes used (1 stroke or over 30 strokes).

A character, by definition, is a symbol or a picture. The original Chinese characters were actual physical pictures. They were used to record events and to express thoughts. The character SUN was a picture of the sun ☉ and the character MOON was a half-picture of the moon ☽.

After centuries of transformation and simplification, Chinese characters lost their original identities and pictures. The character SUN became 日 and the character MOON became 月 as used today.

Because of the limited supply of pictures and the complexity of some pictures, existing pictures were combined with others to meet the demand for expressing various thoughts and events. The new combined pictures (consisting of a simple character or a root) generally reflected the characteristics of the old ones.

For instance, the character (CLEAR 明) is derived by combining the characters (SUN 日) and (MOON 月). The sun gives light during the day and the moon gives light at night. Things on earth are always clear because there is light from the sky during the day and night.

Another example is the character (GOOD 好). It is made of the characters (GIRL 女 and BOY 子). The marriage between a boy and a girl creates joy, and produces babies that continue the human race, so this is good. A (NATION 國) is a piece of land surrounded by four walls (囗, which is a square, not a mouth (口). Within the piece of land surrounded by four walls are living things with a mouth (口), tools (ax 戈 and knight ヽ), and a forest (森) that is a place where many tree/wood (木) grow. It can be seen that the Chinese characters were pictures with thoughts drawn together.

Many of the original pictures (simple character/roots) became the building blocks for the Chinese written language. There are over 214 roots in the root table in the Chinese dictionary for finding characters. The majority of these roots are related to the objects that were known by man during the early age of history, such as:

(sun 日), (moon 月), (gold 金), (tree 木),
(fire 火), (water 水), (land 土),
(grass 草), (fish 魚), (bird 鳥), (insects 虫),
(horse 馬), (man 人), (boy 子), and (girl 女).

Tree, glass, water, and fire are the most popular roots. Chinese characters are formed with one or more writing strokes. There are 26 writing strokes that can be used to write any character. These 26 strokes are listed below and are considered to be the alphabet for the Chinese written language:

| 一 ／ \ ) ノ ィ ヽ ー ㇉ L ｣L L 乚 乁 ㇆ ㇄ 」 ㇂ ㄑ ＜ ㇏ 丶

The formation of Chinese characters is similar to the formation of English words. In English, words are constructed by placing the letters from its 26-letter alphabet in different sequences. In Chinese, characters are constructed by placing root characters (there are over 214 roots formed by the above strokes) within a confined space. The relative position of these roots to each other convey physical relations and meanings. In general, the root on the left-side of the character indicates what this character is related to. Take the character "post" as an example:

The character (post 杆) has (wood 木) as its left-hand root. This indicates that a post is made from wood.

Another example is (river 河) whose left-hand root is "three drops of water (氵)", so that river is related to water.

Some of the roots, related to objects, are placed on either the top or on the bottom of the characters. There is a "Rule of Thumb" which can be applied to reading some characters: "If a character has a right-hand root, then read the root. If a character has no right-hand root, then read the top or bottom half of the character." Examples are shown below:

EXAMPLE A

Characters (post 杆), (stick 竿), (liver 肝) and (sweat 汗). These four characters have the same root (干) on the right/bottom and the same pronunciation, except the last one which is pronounced with a higher accent. The first character (post) has been described above. The second one is (stick 竿) with root (⺮ bamboo) on the top, so that "stick" is related to "bamboo". The third character is (livers 肝) with left-hand root (月 meat), so that "liver" is related to "meat". The last example is (sweat 汗) with "three drops of water (氵)" on the left, so that "sweat" is related to "water".

EXAMPLE B

Characters (river 河), (question 何), (plant name 荷) and (unusual 奇).

These four characters have the same simple character (possible 可) which is formed with the root (丁, teenager) and the root (口, mouth) on the right/bottom. All four characters have the same pronunciation except for the last one which is entirely different. The first example (river) has already been described. The second one is (question 何) with the root (half-man 亻) on the left so that "question" is related to "man". The third character is the name of a plant (荷) with the root (grass) on the top so that (荷) is related to "grass". The last example is (unusual 奇) with a completely different pronunciation from its basic character (possibly 可) which combined "teenager" with a "mouth"). Its root on the top is (big 大) which is formed with a (man 人) with his hands wide open (today, we still open our hands wide to explain something big, beyond explanation).

Note: 人 and 亻 are the same roots. The first one is the basic root and other is the modified root. There are a number of roots, with modified roots, which are generally used on the left or on the bottom of the characters. Such roots are:

水 (氵); 土 (⼟); 火 (灬); 子 (孑) and others.

Because of the space limitation, the size for a given type of stroke varies from character to character, as well as varying from location to location within the character itself. The character (Ten 十) has two strokes and the character (Key 鑰) has 26 strokes. Stroke size variation is illustrated with the character "Mouth" below:

(Mouth 口) is used in the characters (Return 回) and (Key 鑰).

Due to the space confinement and the stroke size variation, it is impossible to use mechanical means with a fixed font size (as in an English typewriter) to type Chinese characters. Although a mechanical Chinese typewriter was granted with a U.S. Pat. No. 2,613,795 in 1952, the Chinese publications are still using type settings.

This unique and complex problem in creating a device that can be used to type Chinese characters has attracted the attention of Chinese and non-Chinese speaking scholars and scientists the world over. Various innovations have been introduced.

With the inception of microprocessor technology, researchers and scholars have been able to utilize computers to develop programmable word-processors to type characters. According to an article in the August 1986 issue of "Newsweek", over some 500 systems have been designed and about a dozen were in production.

Patents covering Chinese character word processing reveal techniques that require users to learn a new set of rules to recall characters, except for U.S. Pat. No. 5,212,769 (The '769 patent) whose rules are the Chinese Traditional Handwriting Rules and are universally applied regardless of where the users live. The Chinese Traditional Handwriting Rules are known to such users.

Based on the information disclosed in issued patents, the basic concepts used to recall characters are:

1) The Four Corner and The Three Corner methods:

The Four Corner uses numerical numbers (0–9) to represent each type of stroke at each corner in the characters instead of using strokes directly. It is understood that the Four Corner method was first used to transmit characters through telephone wires.

Originally the Four Corner method was invented by (a) Chinese educator(s) in the late 1920's or early 1930's, if recalled correctly. It was to be used in Chinese dictionaries to find characters easily, because using the Root-Table (Table of Contents) in the dictionary to find characters is not an easy task for many characters, especially the occasional user.

This inventor had an opportunity to try it, when the Four Corner first came into use. A teacher gave him a brand new copy, advising him to try it out. It is easy to use, she said. It was really easy to use IF the strokes in the characters are well defined.

Otherwise, to find a character using this method is much more complex than using the Root-Table in the dictionary. The Four Corner method is still used in some dictionaries as a Supplement to Root-Table.

Because of its difficulty to use, a verse was written with 10 sentences for the user to easily remember how to use it effectively (using verses in teaching is a common practice in Chinese cultures). There is a verse for each of the four tables for mathematics (add, subtract, multiply and divide as well as for the Abacus application).

To use the Four Corner method, the users depend on their memory.

The Three Corner uses three strokes instead of four strokes. It uses 300 roots (the Root-Table in dictionary has 214). Its users use the "99 table" next to the users where it can read while they type.

To use the Three Stroke method, its users depend on the "99 table" or their memory extensively.

2) The Phonetic (pen-yen) uses the pronunciations of the character to recall characters.

The sounds for the character are represented by phonetic symbols placed on the keys.

To use this system, the user does not have to know how the character is written, but has to know (learn) how the character is pronounced phonetically which may not be his native tongue. The user depends on his memory extensively. This system can only be used to recall characters. It cannot be used to teach character writing with computers.

The Four Corner and Phonetic systems were invented before the computer age.

3) The Writing-Board System/Pattern Recognition Systems

The Writing-Board System/Pattern Recognition Systems compares the written character with the character stored in memory. The written strokes in the character have to be reasonably precise. Thus, it takes considerable time. However, its code number is unique.

4) Stroke Entry Systems

Stroke Entry Systems use keyboards whose keys replace the letters with roots and strokes. This method is widely used because Chinese characters are formed with 26 writing strokes in its alphabet that 214 roots are formed, which in turn form characters.

U.S. Pat. No. 4,684,926 and U.S. Pat. No. 4,689,743 describe use of the type of strokes that are revealed by the '769 patent. Such strokes are in the Chinese alphabet.

U.S. Pat. No. 4,689,743 describes dividing the writing strokes into five mono-strokes (ˋ - ｜ ／ ＼). Each divided stroke is represented by a numerical number. For instance, the character 九 is assigned a code number of 42321, which is a pure numerical number. On the other hand, U.S. Pat. No. 5,212,769 (the '769 patent) divides characters into three mono-strokes; such a character would be assigned code number 1/2-2¦.

U.S. Pat. No. 4,684,926 reveals the most popular Chinese word processor system (the Five Strokes or Wang System) in use today. According to the news media, it has been used in the United Nations and is licensed by many of the biggest United States computer companies as well as many other companies in different countries.

It uses the strokes and roots to recall a character without subdividing into mono-strokes as described by the U.S. Pat. No. 4,689,743 and the '769 patent. The strokes and character codes are artificially assigned. Thus, its user has to memorize a verse of 25 sentences and follow its rules rigidly to recall a character as illustrated by the character "NEW" in its manual below:

Character (NEW 新)

新 = 立木斤  By Wang's Rule

新 = 立斤木  Not allowed under Wang's Rule.

On the other hand, the character code in the '769 patent is mathematically calculated. Its user has the freedom to type any character in any sequence as desired, which is illustrated with the same character (NEW) above and other characters that follow.

Character (NEW 新) can be typed:

1) 新 = 立木斤  According to Handwriting Rules (learned at grade school), with code #7/4-2¦

2) 新 = 立斤木  According to advantages of the '769 patent, with code #7/4-2¦

The number of illustrations for (NEW) is two, which is not the limit. (NEW) and other characters can be typed many different ways in accordance with the teaching in the '769 patent.

One important advantage of the '769 patent is that it enables its user to use the universally accepted Chinese traditional Handwriting Rules to type characters. These rules are taught at grade school levels and used by Chinese language users regardless of where they live. They do not have to learn the new and unique rules set by other Chinese word processor systems.

The basic Handwriting Rules for writing Chinese characters are "Start from the left to the right or from the top to the bottom. Slant strokes can be started in any direction".

When students learn to write, they write over the Red Colored Strokes in the Red Colored Book (used as a guide) in the characters with a writing pen.

A beginning user of the '769 patent, will use a keyboard, ▦ (Figure A) with 26 writing strokes to type the Chinese characters or any of the 13,000 standardized characters in the BIG-5, book published by the Taiwan Board of Education.

The user of the '769 patent, types the Chinese characters stroke-by-stroke according to the Handwriting Rules as if the character was being written by hand ⊔ (see Example C below).

EXAMPLE C

寫⊔ → ` ´ ´´ ´´´ ´´´´ 宀 宀 宀 宁 宁 宁 宁 宁 宁 寫 寫 寫 寫 ▦ → ／ ／ 丁
／ │ − 丁 − − ／ 丁 ／ ／ ／ ／

In normal day-to-day writing, experienced writers write characters by roots and cite the name(s) of the root recognized. They also type the character normally written by hand, except sequentially. The strokes in the characters must be known precisely to the user and how to divide the character if necessary. (Character 寫) again is used for comparison between the beginner and the experienced writer to compare the way each writes and types.

EXAMPLE D

Character (Write 寫)

As concerns the following three lines containing Chinese characters: the first exemplifies handwritten; the second exemplifies that written by an experienced writer; and the third exemplifies that typed with combination keyboard [CK].

寫⊔ → ` ´ ´´ ´´´ ´´´´ 宀 宀 宀 宁 宁 宁 宁 宁 宁 寫 寫 寫 寫
⊔ > 宀 臼 勹 ""
寫⊔ → 宀 臼 勹 ""

An advantage of the '769 patent is that once two-unlike strokes are entered, the remaining strokes in the character can be entered in any manner.

With this advantage, the user can type any character using any desired technique, after the first two-unlike strokes are entered according to the traditional Chinese Handwriting Rules. Thus, it is not necessary for users to follow the Handwriting Rules to completion, see typing flow chart (FIG. 3).

EXAMPLE E

Character (Write 寫)

As concerns the following four lines containing Chinese characters. The first exemplifies handwritten; the second exemplifies that typed with 26 keyboard; the third exemplifies that written by an experienced writer; and the fourth exemplifies that typed with combination keyboard [CK].

寫⊔ → ` ´ ´´ ´´´ ´´´´ 宀 宀 宀 宁 宁 宁 宁 寫 寫 寫
▦ → ／ ／ 丁 ／ │ − 丁 ／ ／ ／ ／
⊔ → 宀 臼 勹 ""

寫⊔ → 宀 臼 勹 ""
⊔ → 宀 臼 ´丁 ""
⊔ → 宀 臼 臼 ""
⊔ → 宀 "" 臼 勹
⊔ → 宀 臼 臼 ""
⊔ → 宀 臼 "" 勹
⊔ → 宀 "" 勹 臼

The preceding was typed pursuant to the '769 patent, which allows the user to enter the remaining strokes in the character in any manner after two-unlike strokes are entered; The first key entry is 宀 which has two-unlike strokes so that the remaining strokes are 臼 勹 "" which can be entered in any way the user desires.

The '769 patent does not dictate what and how many roots in a given character are to be used. It is up to the user to determine how a character is to be typed and to ensure that the Handwriting Rules requirement is met. Regardless of what roots are used, the final [code >>] for the character (Write) is the same, which is 11/6-2¦.

寫 > "" 勹 臼 宀
寫 > 勹 臼 宀 ""
寫 → ／ 宀 臼 勹 ㇏
寫 → ／ ／ ／ ／ 宀 臼 勹

According to the Handwriting Rules, the sequence for "Write" is (/-) The root for ( "" ) is (/) and the root for ( 勹 ) is (/-), so that the roots used for "Write" satisfy the Handwriting Rules requirements.

It is desirable to reduce the number of key entries necessary to form Chinese Characters over that of prior art Chinese Character word processors.

SUMMARY OF THE INVENTION

One aspect of the invention resides in an apparatus and a method of Chinese character word processing. It includes interpreting key entries as signifying components of Chinese characters, the components being selected from a group consisting of roots and three types of strokes, namely horizontal strokes, vertical strokes, and slant strokes, the roots being a composite of the three types of strokes.

After so interpreting, the invention includes counting the horizontal strokes found in the components corresponding to the key entries to obtain a total count of the horizontal strokes; counting the vertical strokes found in the components corresponding to the key entries to obtain a total count of the vertical strokes; counting the slant strokes found in the components corresponding to the key entries to obtain a total count of the slant strokes; and forming a desired Chinese character that contains a total number of horizontal strokes equal to the total count of the horizontal strokes, a total number of vertical strokes equal to the total count of the vertical strokes and a total number of slant strokes equal to the total count of the slant strokes.

BRIEF DESCRIPTION OF THE DRAWINGS

For a better understanding of the present invention, reference is made to the following description and accompanying drawings, while the scope of the invention is set forth in the appended claims.

Figure 1:
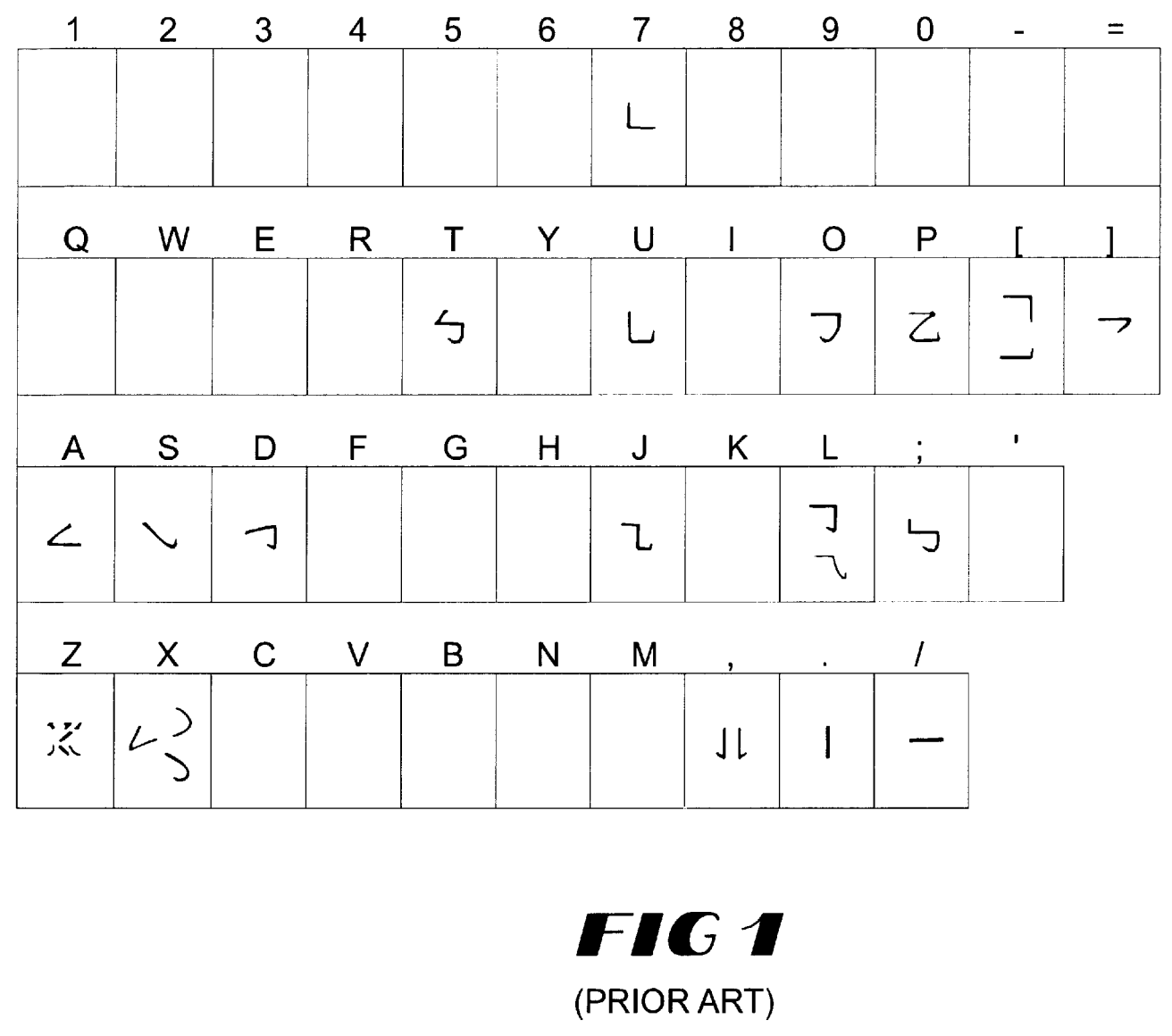

FIG. 1 shows a schematic representation of a 26 stroke keyboard for use in accordance with the prior art.

Figure 2:
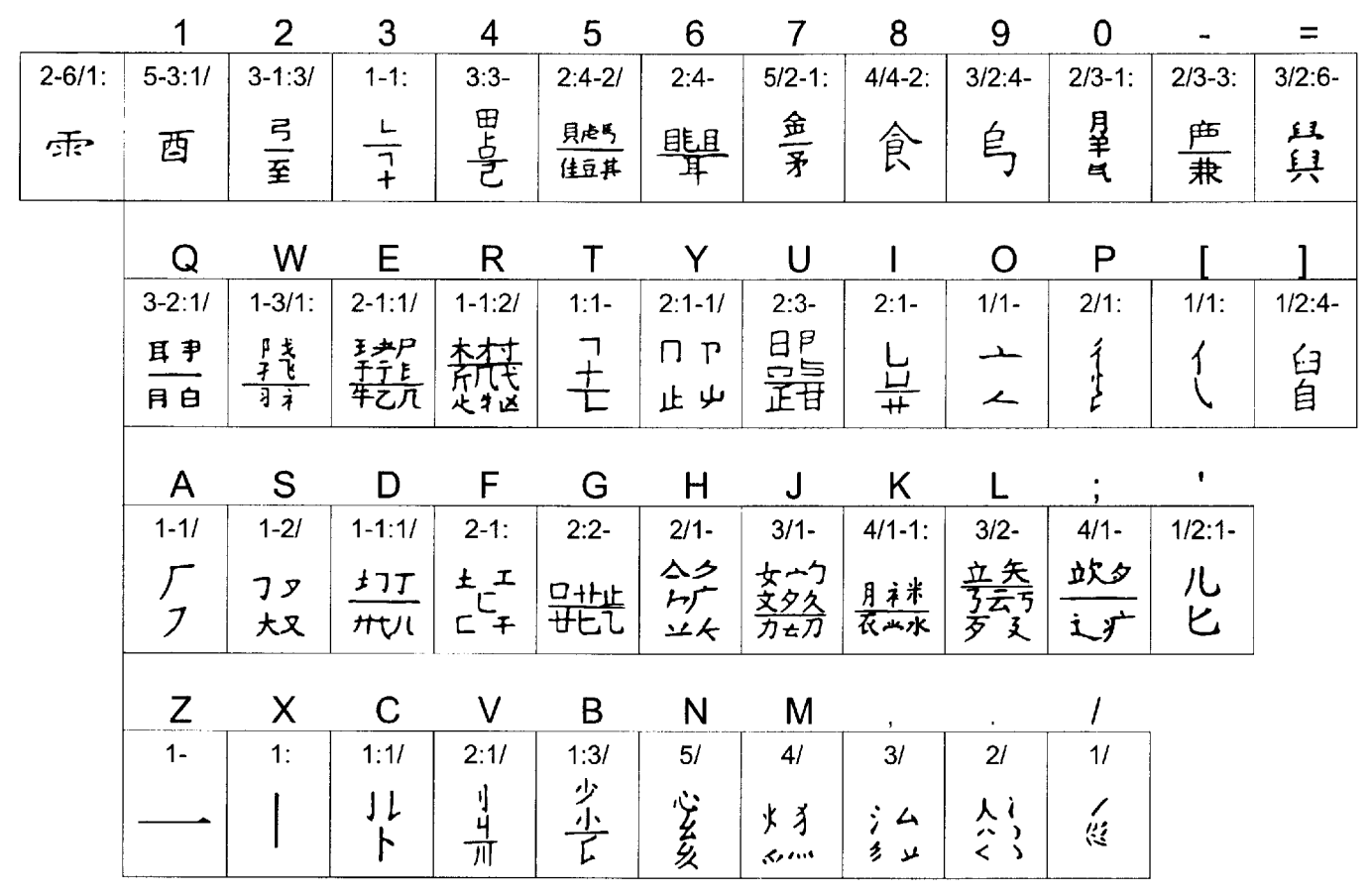

FIG. 2 shows a combination keyboard for use in accordance with the invention.

FIG. 4 shows a schematic representation of a character stroke distribution.

DESCRIPTION OF THE PREFERRED EMBODIMENT

Figure 3:
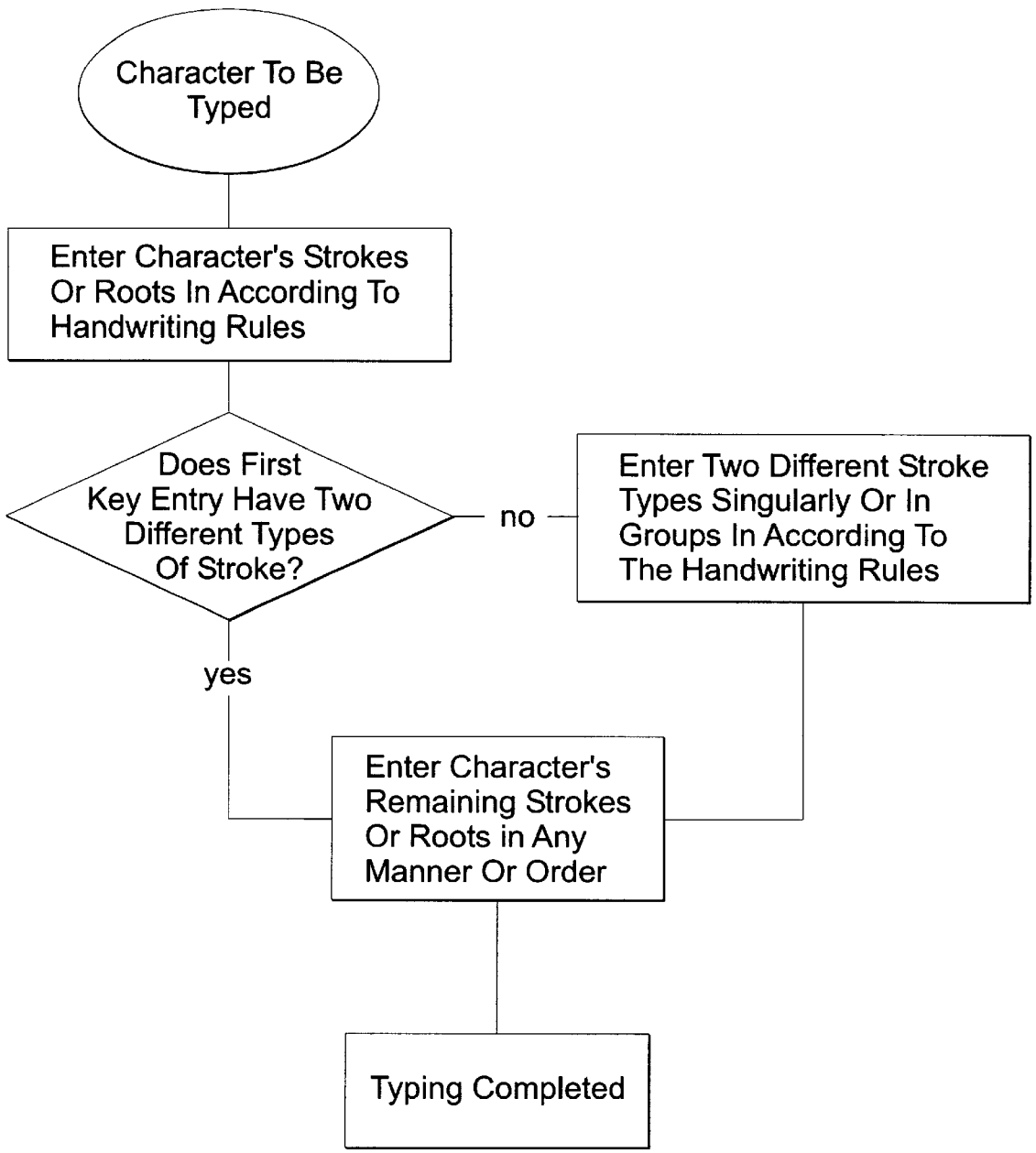
FIG. 3 shows a flow chart for typing with a three stroke word processor in accordance with the invention.

The '769 patent, whose contents are incorporated herein by reference, reveals a Chinese character word processor that has characters stored in computer memory. To recall the characters from the computer memory, the user follows the Chinese Traditional Rules and enters the strokes and roots equal to those in the character. The user can tell immediately whether the character is recalling according to the Handwriting Rules after the two-unlike strokes have been entered. With the roots on the keyboard, over 90% out of the 13,000 characters in a set can be typed in any manner after the first key entered for the character. Some advantages attributed to the present invention include the following:

Advantage 1

"Regardless of where and how many strokes are in a character, if the total for each type of stroke (-|/) is equivalent to the total number of strokes on a root key, then this root key can be used to enter these strokes."

Using Advantage 1, the user can reduce the number of key entries by combining other roots to divide and change the roots in a character any way desired. Simplifying character typing with Advantage 1 is analogous to reducing a mathematical equation to its simplest terms; the final form is up to the user.

EXAMPLE F

Character (Speak 言)

(Typed according to the Handwriting Rules without using Advantage 1).

As concerns the following four lines containing Chinese characters: the first exemplifies handwritten; the second exemplifies that typed with a 26 keyboard; the third exemplifies that written by an experienced writer; and the fourth exemplifies that typed with combination keyboard [CK].

寫山→ ` ⺍ ⺍ 宀 言 言

圖 → ／ ─ ─ ─ ｜ ㇕ ─

⼞ → 囗 → ⺍ ─ 口

囗 → ⺍ ─ ─ 口

(Same Example F typed using Advantage 1).

囗 → ⺍ ─ 日

Advantage [1] allows the user to sum up strokes of the same type anywhere in the character, and enter these strokes with a key having the equivalent number of strokes. The sum of [ ─ 口 ] is (3-2¦), which is equivalent to Root 日 as shown, because the first entry is ⺍ which has 2-unlike strokes.

囗 → ⺍ 日

The sum of [ ─ ─ 口 ] is (4-2¦), which is equivalent to 日 as shown.

Advantage 2

"Typing errors may be corrected without erasing the error first, if the Root key entered has the same sequence as the character."

It is not uncommon for a typist to enter the wrong key or sequence during typing. With word processor systems (Chinese or English) currently in service, the typist has to erase the error first before correcting the error. By employing the apparatus revealed by the '769 patent, practicing the present method means that erasing is not necessary in many instances.

Advantage 2 allows the typist to correct errors without erasing the error first, which saves time during correction.

The following examples illustrate how Advantage 2 is used to correct errors:

EXAMPLE G

Character (木)

According to the Handwriting Rules, ─ should be entered first and then followed by 木 as shown:

未囗 → ─ 木

However, assume the typist erroneously entered 木 first. Since 木 also starts with ─, then this error can be easily corrected by pressing ─ as shown:

未囗 → 木 ─

Typing errors can be corrected at any time after the first two-unlike-strokes are entered.

Advantage 3

"The same kind of Roots, regardless of where they are in the character, can be entered consecutively."

With Advantage 3, there is no need for the user to move his hand back and forth to the same key. The application of Advantage 3 is simple and is illustrated by the following example:

EXAMPLE H

Character (疊)

As concerns the following two lines containing Chinese characters: the first exemplifies that typed with a combination keyboard [CK]; and the second exemplifies that which is typed pursuant to Advantage 3.

疊 ⼚ → ─ 夕 ─ 田 ⺍ 田 ─ 疊 囗 → ⺍ ─ ─ ─ ─ 夕 田 田

Advantage 4

"Using secondary code to reduce the number of characters that share the same code number with other characters."

As described in the BACKGROUND OF THE INVENTION, the Chinese characters are actually a group of pictures drawn together by hand. Since the Industrial Revolution, many hand made products are replaced by the machine. The English language and many other written languages are now typed with typewriters and word processors, except the Chinese.

To use the modern technologies for printing characters (pictures), many Chinese word processor systems encode a given character (split-up the picture into pieces according to its original form, if possible) and then reconstructs all the pieces together like putting a jigsaw puzzle together (to recall the character).

Because the writing space allocation (area) for a given character is the same, the number of ways to split-up a character is limited. Some characters will eventually have identical pieces (such as a character with the same code number) as other characters. The number of characters that share a given code depend on the number of characters used by the system and how the word processor divides or splits up the characters.

A maximum of 18 characters share a code in the database of 5,400 characters used by the '769 patent. About 40 characters share a code number in a "phonetic system" in a set of 4,500 characters. To find the desired character in the list, some systems use search-and-pick to select the character (by keeping a key pressed until the desired character comes up). Some search for the characters by group (divide the list into small groups). The '769 patent lists all characters that share the code on the monitor screen. To look for the desired character from a long list of characters can cause eye strain.

To minimize looking through a long list of characters, the '769 patent divides the list of characters with a secondary code number (even a third code if useful) which is derived from the first two writing strokes in the character. How to use the first two strokes to look for the desired character is illustrated below:

The following 18 characters come on the screen after the typing is completed. The code number for these characters is (5/5-3|):

冠媒婢宿寅啓服造朔渠渣湘淹稚鉗庖匍祺
The following represents the 26 writing strokes:
| 一 フ乚 丿 乚 L 乙 乁 ㇆ ㇉ ㇃ ㄅ フ ㄥ ㄱ ㇗ ＜ ㇏ ⊃ ⸃
（╱ ╲ ╱ ╱ ╱ ╲ ╲）

This group of strokes are slant strokes (/).

After typing is completed and "ENTERED", the user enters the first two writing strokes in the character and signifies "ENTER", so the character becomes HIGHLIGHTED. If the character is unique, the "ENTER" key is pressed so the character goes to its designated place. If it is not unique, the user selects the one he wants, but from a shorter list.

Below are the characters for the first two writing strokes:

╱ フ 冠祺
＜ 一 媒婢
╱╱ 宿寅朔渠渣湘淹鉗啓
╱ ㇆ 服
╱ 一 稚庖造
╱ ㄅ 匍

The first two writing strokes (second code) for the characters below are the same so that first two codes do not help:
一 ｜ 東某柑杏市 4-3|2/

These characters can be divided with a third code:
一 ｜ ㇆ 東
一 ｜ ｜ 某
一 ｜ ╱ 柑 杏
一 ｜ ㄅ 甫

If additional codes are continuously used, almost all characters will eventually become a unique character. But, there is a limit as to how far to go with such codes relative to the margin of return.

U.S. Pat. No. 4,684,926 and the '769 patent can be used to make every character a unique code because every character whose strokes can be entered according to the Chinese Handwriting Rules are with these two patents. However, the maximum stroke count in a dictionary with 8,000 characters is 32 strokes. The median stroke count is 13 strokes with over 700 characters. Characters with over a 16 stroke count (see FIG. 4) is about 3,000 characters. Sixteen (16) letters in succession to form a word in the English language has no analogy in the traditional Chinese language.

To use U.S. Pat. No. 4,684,926 and to use the '769 patent in conjunction with the prior art 26 key keyboard for Chinese word processors becomes impractical.

While the foregoing description and drawings represent the preferred embodiments of the present invention, it will be understood that various changes and modifications may be made without departing from the spirit and scope of the present invention.

What is claimed is:

1. A method of Chinese character word processing, comprising:
   interpreting key entries as signifying components of Chinese characters, the components being selected from a group consisting of roots and three types of strokes, namely horizontal strokes, vertical strokes, and slant strokes, the roots being a composite of the three types of strokes;

counting the horizontal strokes found in the components corresponding to the key entries to obtain a total count of the horizontal strokes;

counting the vertical strokes found in the components corresponding to the key entries to obtain a total count of the vertical strokes;

counting the slant strokes found in the components corresponding to the key entries to obtain a total count of the slant strokes; and forming a desired Chinese character that contains a total number of horizontal strokes equal to the total count of the horizontal strokes, a total number of vertical strokes equal to the total count of the vertical strokes and a total number of slant strokes equal to the total count of the slant strokes.

2. A method as in claim 1, further comprising performing the key entries, at least some of which being carried out in a sequence other than in accordance with Chinese traditional handwriting rules for writing the desired Chinese character.

3. A method as in claim 2, further comprising compensating for the sequence being other than in accordance with Chinese traditional handwriting rules by performing further key entries without eliminating previously performed key entries.

4. A method as in claim 1, further comprising performing the key entries to include making in succession the same key entry a plurality of times without making the same key entry anywhere else in an overall sequence of the key entries to form the desired Chinese character.

5. A method as in claim 1, comprising the step of performing the key entries in a sequence, interpreting at least an initial two of the key entries in the sequence as being indicative of certain ones of the components, displaying only those Chinese characters whose formation according to traditional Chinese handwriting rules requires that at least an initial two of the components for those Chinese characters be the same as the certain ones of the components and be performed in an order that corresponds to the sequence.

6. An apparatus of Chinese character word processing, comprising
   a processor that interprets key entries as signifying components of Chinese characters, the components being selected from a group consisting of roots and three types of strokes, namely horizontal strokes, vertical strokes, slant and strokes, the roots being a composite of the three types of strokes; the processor being adapted to
   a) count a total number of the horizontal strokes found in the components corresponding to the key entries;
   b) count a total number of the vertical strokes found in the components corresponding to the key entries;
   c) count a total number of the slant strokes found in the components corresponding to the key entries; and
   d) form a desired Chinese character that contains a total number of horizontal strokes equal to the total number of the horizontal strokes, a total number of vertical strokes equal to the total number of the vertical strokes and a total number of slant strokes equal to the total number of the slant strokes.

7. An apparatus as in claim 6, wherein the processor is adapted to form the desired Chinese character in response to the key entries even where a sequence of some of the key entries is other than in accordance with Chinese Traditional Handwriting Rules.

8. An apparatus as in claim 7, wherein the processor is adapted to form the desired Chinese Character despite erroneous key entries by responding to further key entries that compensate for the erroneous key entries to permit the processor to form the desired Chinese character based in part on interpretations of the erroneous key entries and using those interpretations as the components as well.

9. An apparatus as in claim 6, wherein the processor is adapted to respond to a sequence of key entries with a same key entry being made in succession a plurality of times, but without making the same key entry anywhere else in an overall sequence of the key entries to form the desired Chinese character.

10. An apparatus as in claim 6, wherein the processor is adapted to interpret at least an initial two of the key entries in a sequence as being indicative of certain ones of the components, displaying only those Chinese characters whose formation according to traditional Chinese handwriting rules requires that at least an initial two of the components for those Chinese characters be the same as the certain ones of the components and be performed in an order that corresponds to the sequence.

* * * * *

UNITED STATES PATENT AND TRADEMARK OFFICE
CERTIFICATE OF CORRECTION

PATENT NO. : 6,075, 469
DATED : June 13, 2000
INVENTOR(S) : Gim Yee Pong

It is certified that error appears in the above-identified patent and that said Letters Patent is hereby corrected as shown below:

in column 2 lines 45 and 56 the phrase "unusual (荷)" should be deleted and replaced with the phrase "unusual (奇)." In addition, in column 5 line 25 the phrase "⿳ → ／／フ" should be deleted and moved to column 5 line 26 preceding the phrase "／｜ー フ ー ー ／ ゴ ／ ／ ／ ." Further, in column 8 line 31 the phrase "⿳ → ー ー ー ー ー 夕 田 田" should be deleted and moved to a newly inserted blank line between line 31 and line 32 in column 8.

Signed and Sealed this

Twenty-fourth Day of April, 2001

Attest:

NICHOLAS P. GODICI

Attesting Officer

Acting Director of the United States Patent and Trademark Office